(12) United States Patent
Bruner et al.

(10) Patent No.: US 9,615,250 B2
(45) Date of Patent: Apr. 4, 2017

(54) SUBSCRIBER IDENTIFICATION MODULE POOLING

(71) Applicant: Microsoft Technology Licensing, LLC, Redmond, WA (US)

(72) Inventors: John Bruner, Bellevue, WA (US); Calvin Choe, Redmond, WA (US); Shai Guday, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/572,209

(22) Filed: Dec. 16, 2014

(65) Prior Publication Data

US 2016/0174069 A1    Jun. 16, 2016

(51) Int. Cl.
  *H04L 12/58*   (2006.01)
  *H04W 12/04*   (2009.01)
  *H04L 29/06*   (2006.01)
  *H04W 12/06*   (2009.01)
  *H04W 8/18*    (2009.01)

(52) U.S. Cl.
  CPC ........... *H04W 12/04* (2013.01); *H04L 63/065* (2013.01); *H04L 63/102* (2013.01); *H04W 8/18* (2013.01); *H04W 12/06* (2013.01)

(58) Field of Classification Search
  CPC ..... H04W 8/265; H04W 12/04; H04W 12/08; H04W 8/183; H04B 1/3816; H04L 63/102
  USPC ................................ 455/411–412
  See application file for complete search history.

(56) References Cited

U.S. PATENT DOCUMENTS

| | | |
|---|---|---|
| 6,978,156 B1 | 12/2005 | Papadopoulos et al. |
| 7,369,848 B2 | 5/2008 | Jiang |
| 7,912,464 B2 | 3/2011 | Jiang |
| 7,979,066 B2 | 7/2011 | Pan |
| 8,478,238 B2 | 7/2013 | Mohammed et al. |
| 8,515,488 B2 | 8/2013 | Hillier et al. |
| 8,571,537 B2 | 10/2013 | Kaliner |
| 8,718,711 B2 | 5/2014 | Shi |
| 8,812,054 B2 | 8/2014 | Hannu et al. |
| 2004/0229601 A1* | 11/2004 | Zabawskyj ......... H04W 76/025 455/417 |
| 2005/0075106 A1 | 4/2005 | Jiang |
| 2005/0164737 A1 | 7/2005 | Brown |
| 2010/0159924 A1 | 6/2010 | Lagerman et al. |
| 2012/0322410 A1 | 12/2012 | Lodeweyckx |

(Continued)

FOREIGN PATENT DOCUMENTS

| | | |
|---|---|---|
| EP | 2549785 A1 | 1/2013 |
| EP | 2793496 A1 | 10/2014 |

OTHER PUBLICATIONS

"Reprogramimable SIMs: Technology, Evolution and Implications", In Technical Report, Sep. 25, 2012, 95 pages.

(Continued)

*Primary Examiner* — Qutbuddin Ghulamali (57) ABSTRACT

Pools of cellular devices share same provisioning profiles for cellular (over-the-air) provisioning connectivity. Conceptually, a limited pool of one or more provisioning profiles is setup in an MNO's backend equipment. Multiple cellular devices are each configured with a same provisioning profile from the pool. In practice, the number of provisioning profiles in a pool may be orders of magnitude less than the number of cellular devices configured to use the provisioning profiles in the pool.

20 Claims, 7 Drawing Sheets

(56) References Cited

U.S. PATENT DOCUMENTS

| | | | |
|---|---|---|---|
| 2013/0340040 A1* | 12/2013 | Park ..................... | H04L 63/08 |
| | | | 726/3 |
| 2014/0051423 A1 | 2/2014 | Marsden et al. | |
| 2014/0310785 A1* | 10/2014 | Prabdial ............... | H04W 8/183 |
| | | | 726/5 |
| 2015/0143125 A1* | 5/2015 | Nix .................. | H04W 52/0235 |
| | | | 713/171 |
| 2015/0215121 A1* | 7/2015 | El Mghazli .......... | H04L 9/0844 |
| | | | 713/171 |
| 2015/0349825 A1* | 12/2015 | Lee ..................... | H04W 8/205 |
| | | | 455/558 |

OTHER PUBLICATIONS

PCT Search Report, mailed May 16, 2016, application No. PCT/US2015/065426.

Menezes, et al., "Handbook of Applied Cryptography", CRC Press LLC, 1997, pp. 543-590.

"Second Written Opinion Issued in PCT Application No. PCT/US2015/065426", Mailed Date: Nov. 2, 2016, 5 pages. (MS# 356377-WO-PCT).

* cited by examiner

RELATED ART

SUBSCRIBER IDENTIFICATION MODULE POOLING

BACKGROUND

Presently, a variety of types of devices are capable of being configured with hardware and software necessary to function as mobile stations (user equipment) that can communicate with cellular networks. Laptops, smartphones, and tablets, are examples of devices often sold in cellular-capable and non-cellular configurations. Part of the cost of configuring devices for cellular communication stems from the need to generate and distribute unique communication parameters for each device. Typically, this involves a SIM Manager (Subscriber Identification Module), which may manufacture SIM cards and generate for each SIM card a unique secure key and a unique IMSI (International Mobile Subscriber Identity), among other things. This information, or profile is usually a requisite for cellular communication protocols, must be securely stored on a SIM card, and must in turn be provided to an MNO (Mobile Network Operators) for storage in the MNO's HLR (Home Location Register). To date, these steps have been performed for nearly all cellular-capable devices produced, regardless of whether such devices are ultimately activated with an MNO for performing cellular communications. Considering that many cellular-capable devices are never activated, the corresponding total cost of providing an unused capability can be significant.

Lowering the cost of configuring devices to have unactivated cellular capability would not only have obvious direct benefits, but if costs were lowered sufficiently, device vendors might be able to stop producing non-cellular versions of some devices (due to lowered cost differential). Such a consolidation would likely lead to efficiency gains in production, customer support, software maintenance, etc. In addition, proliferation of cellular capability would be convenient for users. For example, if most devices were cellular-capable or if the prices of comparable cellular and non-cellular devices were sufficiently close, purchasers would not need to decide, when purchasing a device, whether additional up-front purchase price should be paid to have a capability whose need may be uncertain at the time of purchase.

For these reasons and others, it is desirable to reduce the cost of configuring devices to have cellular communication capability. In particular, it would be beneficial to avoid the need for MNOs to store and manage a unique waiting-to-be-activated profile (e.g., a SIM profile) for every respective cellular device that is to be sold, a significant portion of which may never be activated with an MNO.

Techniques related to pooling and sharing lightweight and possibly limited-privilege SIM profiles ("provisioning profiles") among multiple cellular devices are discussed below.

SUMMARY

The following summary is included only to introduce some concepts discussed in the Detailed Description below. This summary is not comprehensive and is not intended to delineate the scope of the claimed subject matter, which is set forth by the claims presented at the end.

Pools of cellular devices share same provisioning profiles for cellular (over-the-air) provisioning connectivity. Conceptually, a limited pool of one or more provisioning profiles is setup in an MNO's backend equipment. Multiple cellular devices are each configured with a same provisioning profile from the pool. In practice, the number of provisioning profiles in a pool may be orders of magnitude less than the number of cellular devices configured to use the provisioning profiles in the pool.

Many of the attendant features will be explained below with reference to the following detailed description considered in connection with the accompanying drawings.

BRIEF DESCRIPTION OF THE DRAWINGS

The present description will be better understood from the following detailed description read in light of the accompanying drawings, wherein like reference numerals are used to designate like parts in the accompanying description.

DETAILED DESCRIPTION

Description of inventive embodiments will begin with discussion of terms used herein. Then, an overview of an authentication process for a cellular device attaching to a network will be presented. Aspects of SIM profiles will then be discussed, followed by explanation of methods for producing provisioning profiles as well as features of such profiles. Different ways of providing cellular devices with provisioning profiles will be explained. This will be followed by description of processes that might be helpful for using provisioning profiles to authenticate cellular devices.

A number of cellular telephony terms will be used herein. Absent a definition provided herein, such terms will have their ordinary meaning. The term "card" refers to well-known types of smart cards such as SIM cards, UICCs (Universal Integrated Circuit Card), embedded UICCs (eUICCs, sometimes misleadingly referred to as "soft SIMs"), true "soft SIMs" implemented fully or partially by the main memory and CPU of a cellular device, TPM (Trusted Platform Module) implementations, etc. The term will also refer (i) specifically, to e-SIMs (embedded SIMS) with features found in the GSMA's "Embedded SIM Remote Provisioning Architecture" (see, for example, Version 1.1, 17 Dec. 2013), and (ii) generally any cards which may not be easily accessible or replaceable or are not intended to be removed or replaced in a cellular device, and yet enable secure changing or addition of cellular subscriptions. Generally, the term refers to any hardware/software implementation of a module that secures authentication data for accessing a cellular network, and will usually have the ability to securely store and possibly modify, add, or remove profiles. A typical card will have cryptographically secured storage and one or more processors, possibly including a crypto-processor.

The terms "profile" and "provisioning profile" will refer to a discrete set of information that can be used to authenticate a cellular device with an MNO's Authentication Center (AuC) to gain access to an MNO's cellular network. For additional information on the USIM application on a card, see the "3GPP TS 31.102" specification, and for additional information on security, see the "3GPP TS 33.102" specification. In some embodiments, "provisioning profiles" may authorize only limited privileges and, depending on implementation, may have the same type data found in a complete activated subscriber profile.

The term "cellular device" refers to any device with the capability to communicate with a cellular network (i.e., a mobile station, or user equipment), regardless of the type of apparatus, if any, that such device might be a part of, including, for example, test equipment, devices used in so-called machine-to-machine communications (i.e., devices that usually perform cellular communication without user control or input), for instance appliances, utility meters, vehicles, robots, etc. The term will usually be considered to include any card installed on the cellular device being referred to. The term "mobile device" will sometimes be used herein as an example of a cellular device.

The term "network", unless specified otherwise, as used herein, refers to cellular networks of any type, including, for example, Global System for Mobile Communications (GSM) networks, General Packet Radio Service (GPRS) networks, CDMA variants, Evolution-Data Optimized (EV-DO) networks, Enhanced Data Rates for GSM Evolution (EDGE) networks, Universal Mobile Telecommunications System (UMTS) networks, LTE (Long-Term Evolution) networks, etc. It might be noted that SIM cards are sometimes used for other authentication as well, for example, authentication for WiFi hotspots using EAP-SIM (Extensible Authentication Protocol SIM), EAP-AKA (Extensible Authentication Protocol-Authentication and Key Agreement), and EAP-AKA-prime.

Depending on context, the term "MNO" will refer to either a firm that operates a mobile network, or equipment or apparatus(es) operated by a Mobile Network Operator.

Figure 1:
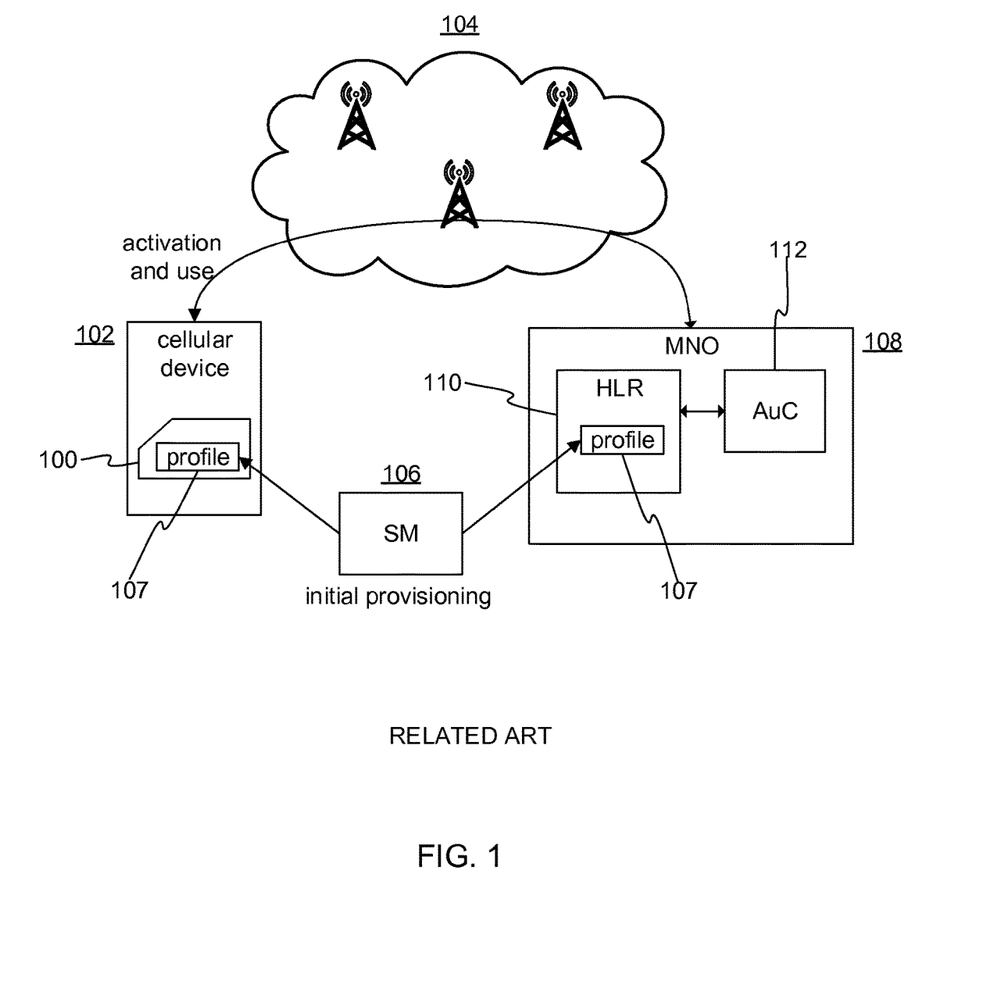
FIG. 1 shows elements involved in the configuration of a card and use of the card to authenticate a cellular device on a network.

FIG. 1 shows elements involved in the configuration of a card 100 and use of the card 100 to authenticate a cellular device 102 on a network 104. The card 100 may initially be configured by a SIM Manager (SM) 106, which typically involves the SM 106 generating values that are securely stored on the card 100. Such values usually include a secret key (Ki) and an IMSI (International Mobile Subscriber Identity), which serve as a profile 107. The values often include other information such as an ICCID (Integrated Circuit Card Identifier), a pin, an unlock key, etc. The secret key and the IMSI are then communicated through a secure channel to an MNO 108, which stores the credentials, or profile 107, in a HLR 110 (Home Location Register).

When the cellular device 102 attempts to attach to the network 104, the cellular device 102 connects through a cell tower, finds an appropriate channel, identifies itself to the MNO 108, identifies the MNO 108, and perhaps gets tied to appropriate services at the back end, such as the MNO 108's AuC 112. An identity verification process is then initiated, with verification for the cellular device 102 performed by a secure application running on the card 100, and verification for the MNO 108 generally performed by the AuC 112.

Identity verification begins with the cellular device 102 transmitting an identity value provided by the card 100 to the AuC 112. The AuC 112 receives the identity value and encrypts it with a symmetric encryption algorithm based on the secret key (obtained from the profile 107 in the HLR 110). The AuC 112 also generates a random number—a nonce—and sends both items back to the cellular device 102. In response, the cellular device 102 does two things. Using the same encryption algorithm and the secret key, the card 100 decrypts the encrypted value and then compares the decrypted value to the originally transmitted identity value to verify that the MNO 108 is trusted (i.e., possesses the secret key). The cellular device 102 also takes the nonce, applies the encryption algorithm (card 100) with the key to encrypt the nonce, and sends the encrypted nonce to the AuC 112. The AuC 112 uses the secret key to decrypt the nonce, and then the MNO 108 trusts cellular device 102 if the decrypted nonce matches the originally transmitted nonce.

To further decide whether to trust the MNO 108, as part of processing the cryptographic handshakes, the cellular device 102 may check a sequence number from the MNO 108 (usually, from the AuC 112). To avoid replay attacks, the MNO 108 maintains a sequence number in association with the identity (i.e., IMSI) of the cellular device 102 that is incremented each time the MNO 108 performs another authentication for the same IMSI, even if for another cellular device. The MNO 108 transmits the sequence number with the nonce. During verification, for each response from the MNO 108, the card 100 usually requires that a sequence number of the response is larger than the sequence number of the previous response from the MNO 108 (i.e., the card expects sequence numbers to not repeat). In practice, for verification, there may be complex rules to verify that the most recently received sequence number is within an appropriate range and was not already received. In some embodiments, the card 100 tracks a set of recently used sequence numbers and determines if a copy of the incoming sequence number exists in the set. Once verification has been completed the cellular device 102 may be considered authenticated and the MNO 108 may authorize the cellular device 102 to access various backend resources, for instance, one or more APNs (Access Point Names) such as an Internet APN, an IMS (IP Multimedia System) APN, etc.

The example authorization process described above is a condensed description of a 3GPP authentication protocol; for discussion, some details have been omitted. Other procedures which rely on a provisioning profile can be used to establish trust between a cellular device and an MNO.

When cellular devices are initially configured and sold to a user without a subscription to a particular MNO, or, for instance, when cellular devices are reset or receive a new card, it may be desirable to enable those cellular devices to subscribe over-the-air (via a cellular network) to a specific MNO. Over-the-air subscription or registration of a cellular device with a target MNO requires that the new cellular device be able to attach to some initial cellular network in order to communicate with the target MNO. This attachment requires verification of the cellular device by the MNO of the initial cellular network (for example, as described with reference to FIG. 1). For discussion, it will be assumed that the target network and the initial network are the same and are operated by the same MNO, although they may be different.

Figure 2:
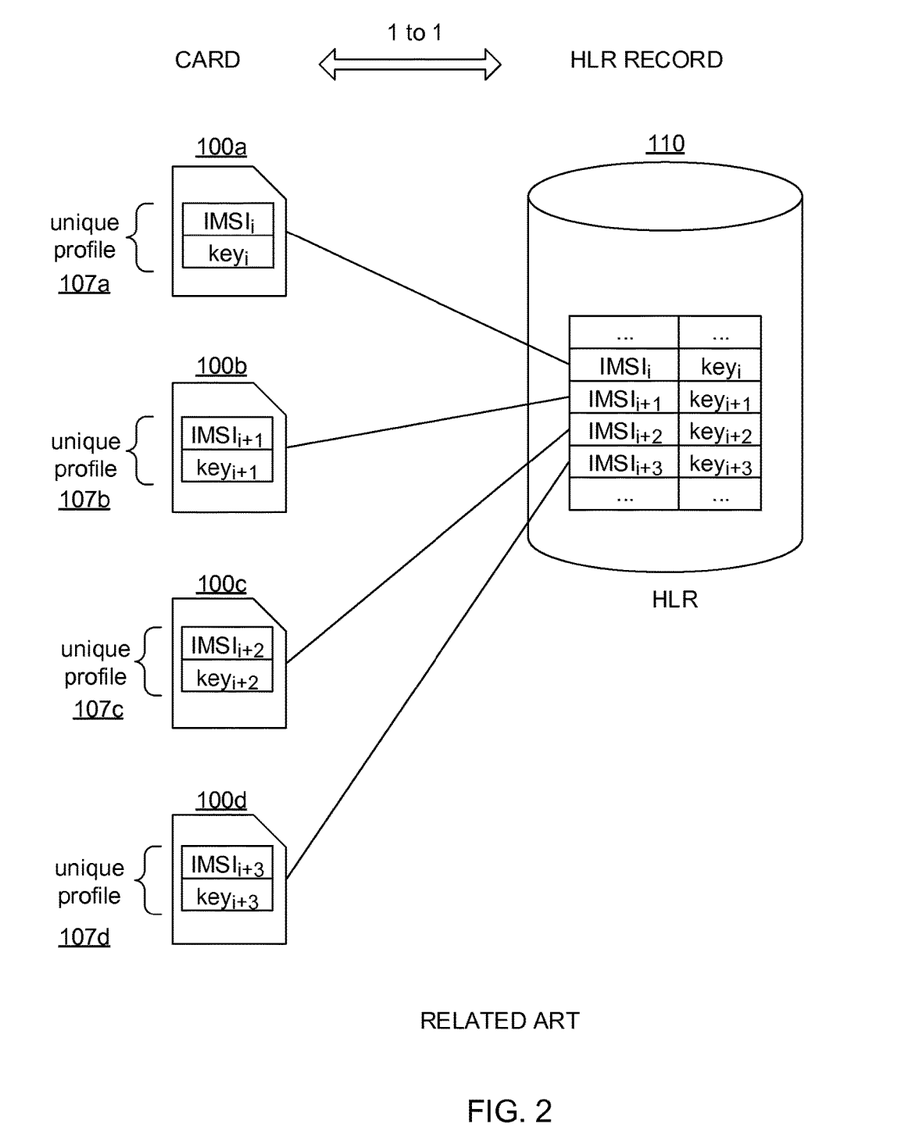
FIG. 2 shows a prior approach of providing cellular devices with respective unique profiles.

To attach to the MNO's network for over-the-air subscription with the MNO, the cellular device must be able to verify the MNO, and the cellular device must be able to properly identify itself to the MNO to allow the MNO to verify the cellular device. To this end, the cellular device must be able to present an identity (e.g., an IMSI), and credentials derived from a secret key, where the identity and the secret key are known to the MNO. As shown in FIG. 2, a prior approach has been to provide cellular devices, for example each new cellular device, with a respective unique profile. This may involve storing unique profiles 107a-107b on respective cards 100a-100d, with respective records in the HLR 110. With this one-to-one approach, when cellular devices are produced and sold by the tens or hundreds of millions, there can be substantial cost and overhead to provide one or more HLRs, and each cellular device's card, with a profile (e.g., IMSI, secret key, etc.) that enables each cellular device to initially attach to a cellular network for the purpose of activating with or subscribing to an MNO. In sum, there is significant total overhead for setting up functioning profiles for large numbers of devices, and that overhead may be largely wasted if the devices have a low attachment rate. Hereafter, the term "provisioning profile" will refer to a profile that enables over-the-air initial attachment to a network, and "subscriber profile" will refer to a profile that is created (or assigned, if such profiles are created in advance) while connected to the network with the identity of a provisioning profile.

The inventors alone have appreciated that it may be beneficial to reduce the burden of setting up a unique subscriber or provisioning profile for each cellular device; generating, storing, and managing so many profiles is costly. The inventors alone have further appreciated that it may be possible to store at HLR(s) one or more provisioning profiles that can be concurrently shared by pools of cellular devices for the specific and perhaps limited purpose of enabling over-the-air provisioning of unique subscriber profiles. In other words, multiple cellular devices may be concurrently configured with a same provisioning profile or with the ability to simulate or create non-unique provisioning profiles.

Figure 3:
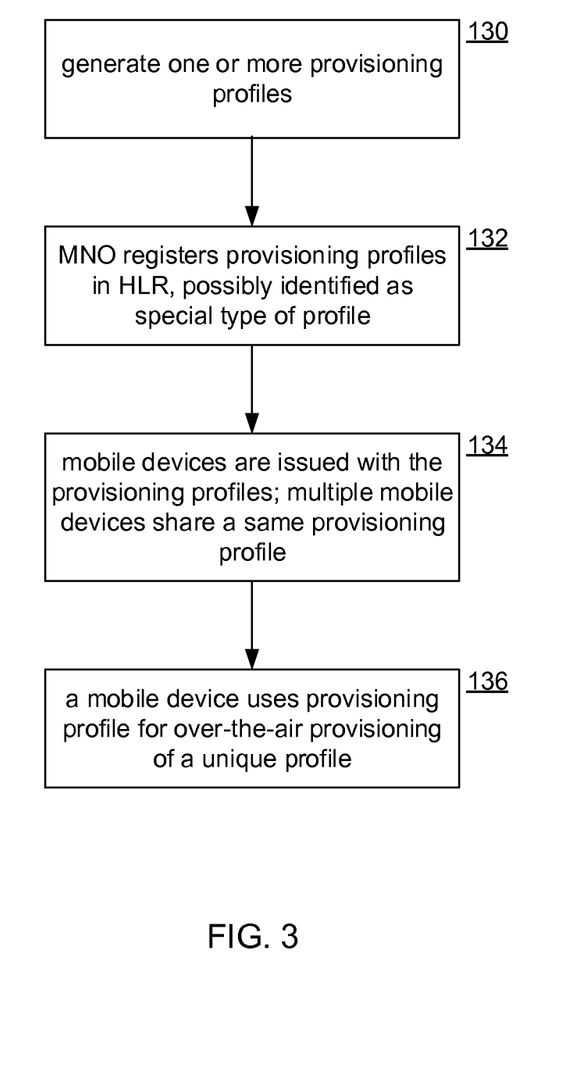
FIG. 3 shows a process for configuring cellular devices and MNOs to use one or more provisioning profiles to be shared among one or more pools of cellular devices.

FIG. 3 shows a process for configuring cellular devices and MNOs to use one or more provisioning profiles to be shared among one or more pools of cellular devices. Beforehand, one or more provisioning profiles are generated at step 130. Step 130 may be performed by one or more SMs, one or more MNOs, SMs and MNOs cooperating, or other firms such as vendors of cellular devices. For discussion, it will be assumed that only one MNO uses the provisioning profiles, although in practice a provisioning profile may be distributed to many MNOs.

At step 132, the MNO registers the one or more provisioning profiles (for discussion, now referred to in the plural) in its HLR. As will be discussed in detail later, the HLR might be configured to allow the MNO to identify the provisioning profiles as special types of profiles with perhaps limited privileges. At step 134, cellular devices are configured to be able to use the provisioning profiles. This may be done in many ways. The card of each cellular device might store the same single provisioning profile. Or, if for example there were 1,000,000 new cellular devices and 1,000 provisioning profiles, those devices might be divided into groups of 1,000, and provisioning profiles might be assigned to the respective groups. In addition, devices might be assigned multiple or all of the available provisioning profiles (some cards, for instance TPM-implemented cards, may have sufficient storage). Provisioning profiles might be distributed to cards/devices in round-robin fashion, randomly, as a hash of a card's ICCID, or otherwise. Another approach, described in detail later, is to configure cards to be able to dynamically generate one or more of the provisioning profiles, perhaps when attempting to attach to a network. Other techniques may be used to determine which cellular devices (cards) will use which provisioning profile(s).

As represented by step 136, once a cellular device has a provisioning profile or sufficient credentials to serve as a profile, the provisioning profile is used for over-the-air provisioning of a subscriber profile. After such an activation, the provisioning profile may be deleted or deactivated and saved for future use. Note that the process of FIG. 3 may be used in a variety of scenarios. For example, when a new cellular device is produced or bought, when a cellular device is reconfigured, when a user transfers an existing profile to a cellular device such as when upgrading to a new cellular device, and others.

Figure 4:
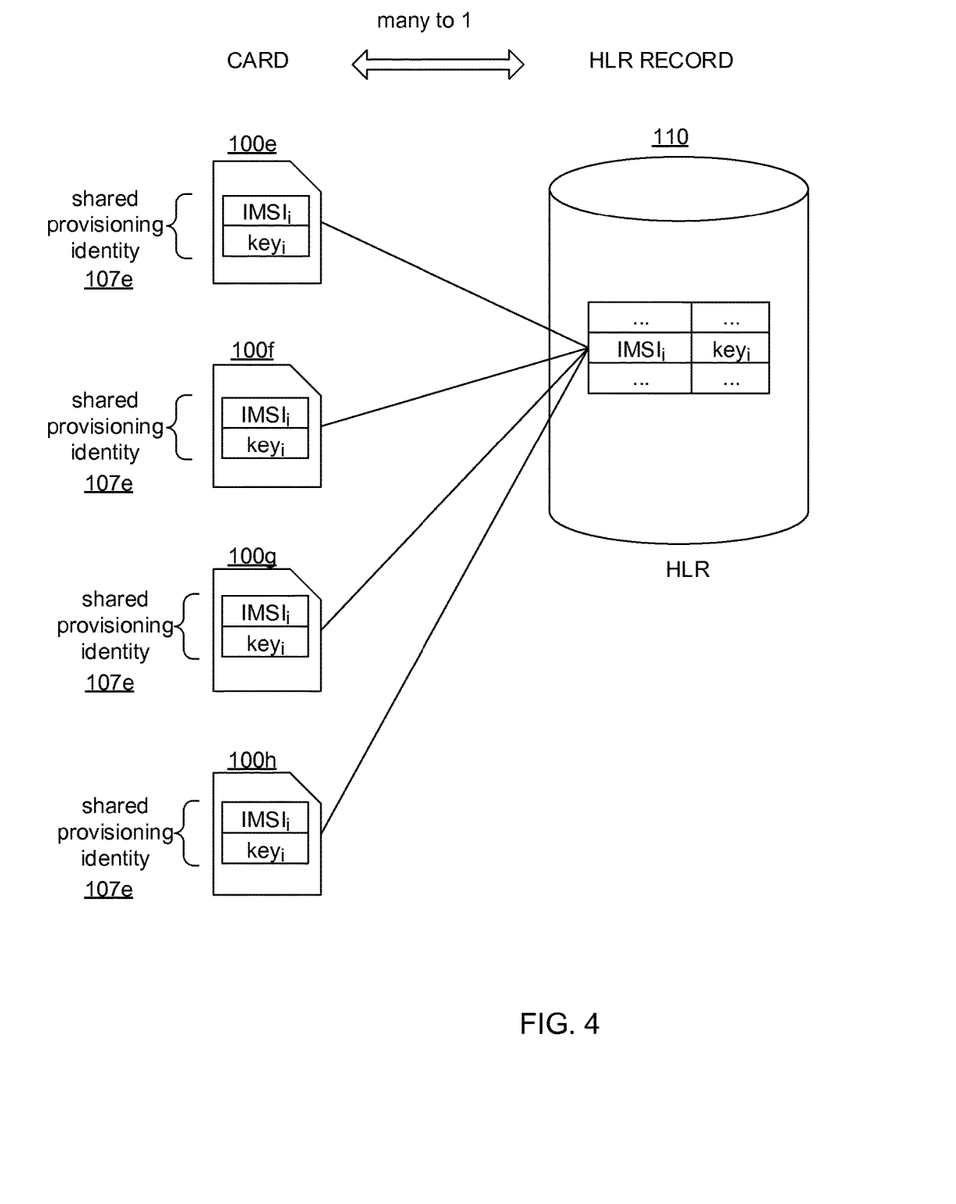
FIG. 4 shows a one-to-many embodiment where a same provisioning profile is stored by multiple cards.
Figure 5:
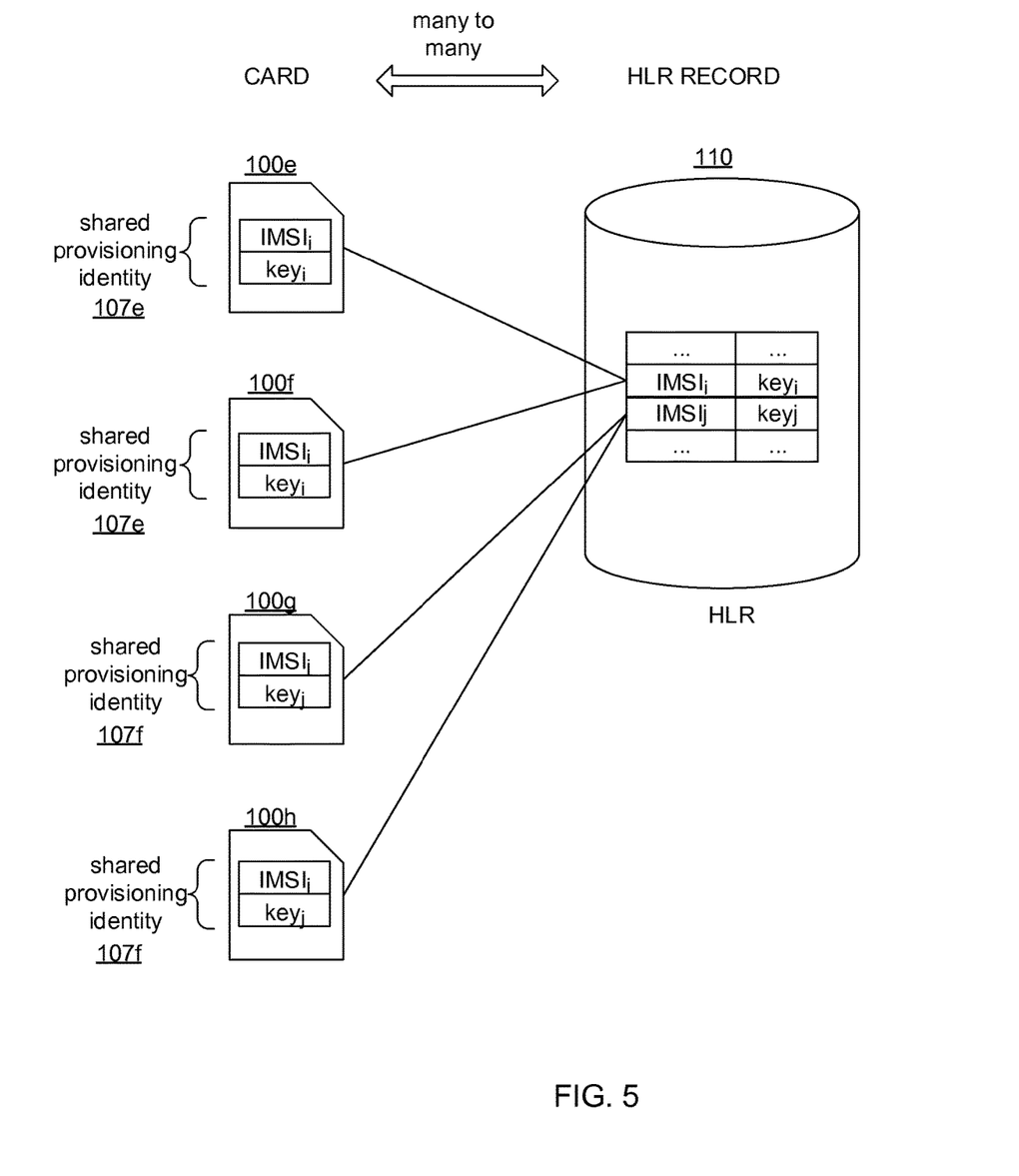
FIG. 5 shows a many-to-many embodiment.

FIG. 4 shows a one-to-many embodiment where a same provisioning profile 107e is stored by multiple cards 100e-100h. FIG. 5 shows a many-to-many embodiment. With this embodiment, groups of cards respectively share different of the provisioning profiles. For example, card 100e and card 100f share a provisioning profile that includes $IMSI_i$ and $key_i$, and card 100g and card 100h share another provisioning profile that includes $IMSI_j$ and $key_j$. In another many-to-many embodiment, multiple cards may store multiple shared provisioning profiles. For example, cards 100e-100h may each store ($IMSI_i$, $key_i$) and ($IMSI_j$, $key_j$). The storing of the provisioning profiles may be performed at any time. For instance, prior to sale a provisioning profile might be stored to a card by an SM or MNO. Or, a provisioning profile might be stored after being dynamically generated by a card or device, possibly triggered by invocation of a verification application. In addition, the HLR 110 may be any of a variety of known HLR implementations with little or no modification needed to enable profile sharing. In one embodiment the HLR 110, an AuC, or some other backend facility might be modified to be able to recognize profiles as being designated for provisioning in order to restrict access privileges.

Figure 6:
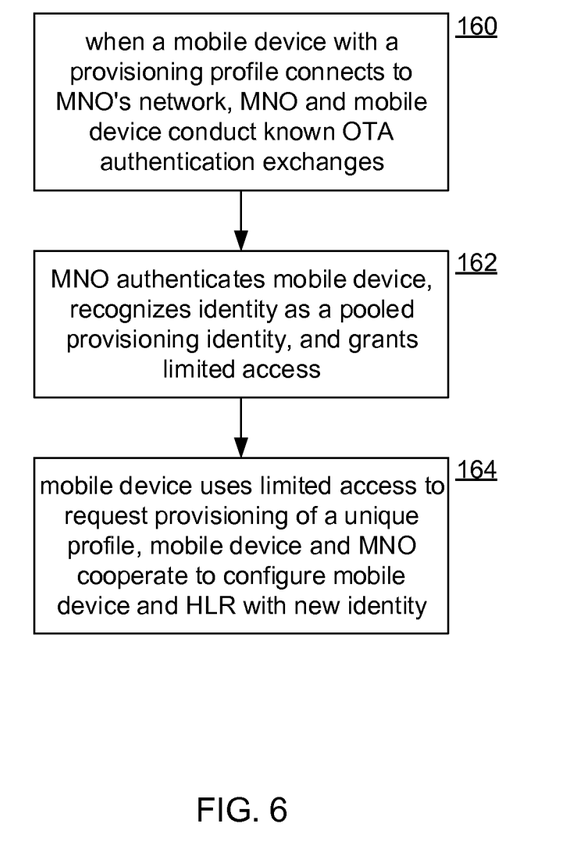
FIG. 6 shows a verification process using a shared provisioning profile.

FIG. 6 shows a verification process using a shared provisioning profile. Although a provisioning profile might be shared by cellular devices, the verification process may nonetheless comply with any standard verification protocol, for instance as defined by a GSM standard. Nonetheless, some optional measures are described below that may be helpful when performing authentication with provisioning profiles. These measures may cause minimal or no deviation from the relevant standard cellular protocol.

At step 160, a cellular device attempts to attach to an MNO's network using the IMSI of a provisioning profile stored by the cellular device. A known standard authentication protocol or variant thereof is used to authenticate the cellular device. For example, encrypted handshakes using the secret key of the provisioning profile may be used to verify the identities of the MNO and the cellular device. If the verification is successful, then at step 162 the cellular device is considered authenticated and is granted access, perhaps limited, to the MNO. At step 164 the connection with the MNO's network is used to configure a unique subscriber profile for the cellular device. The subscriber profile is associated with the cellular device in the MNO's HLR, and the cellular device's card stores the subscriber profile, which is then activated on the cellular device.

With some exceptions, an MNO will usually permit only one connection for one IMSI, to prevent fraud or network failures. When provisioning profiles are shared among a group of cellular devices, some of those cellular devices might attempt to use a same provisioning profile at the same time. When an MNO detects a new connection request for an IMSI that is in use, the MNO will ordinarily return an error or denial notification such as a "card in use" message. Measures can be taken by the cellular device to handle such collisions with minimal disruption or delay experienced by a user of a device. A simple approach is to wait a short time and try again with the same provisioning profile. If multiple provisioning profiles are available to the cellular device (from storage or from dynamic generation), another approach is to try another provisioning profile when there is a collision. If a pool of provisioning profiles are available, an initial one may be selected by the card in a way that helps reduce the chance of a collision. For example, a hash function might map one or more data items on the cellular device or card to an IMSI. In another embodiment, if a GPS location is available, an IMSI can be selected that corresponds to a region containing the location. Random selection of a provisioning profile may also be effective.

Figure 7:
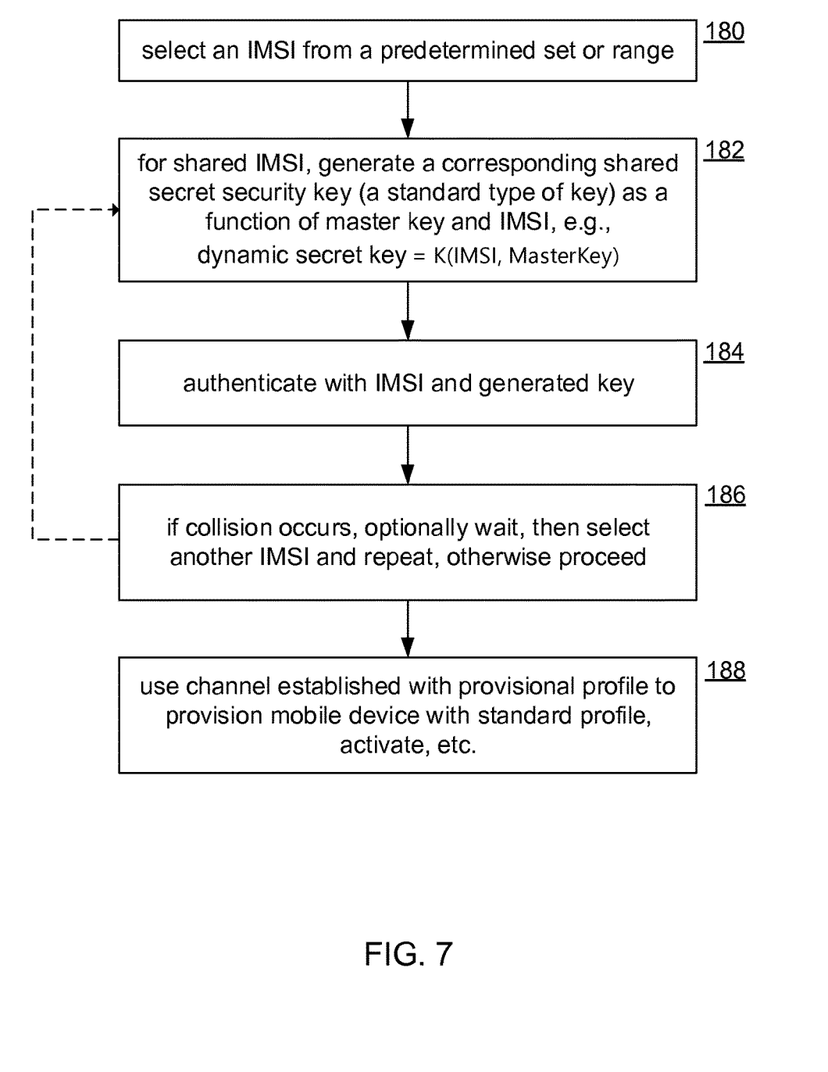
FIG. 7 shows a process for dynamically generating provisioning profiles.

As mentioned above, a provisioning profile, or credentials for a provisioning profile, may be generated dynamically, on-demand or based on a signal indicating that a connection attempt is imminent (e.g., opening a "phone app" on the cellular device). FIG. 7 shows an example of such a process. The embodiment corresponding to FIG. 7 may start with an assumption that provisioning profiles are defined to be profiles that have an IMSI within a predetermined range. In one embodiment, the range is fixed by what is on the cards, and the AuC need not have any knowledge of the IMSIs and treats them as a normal (IMSI, secret key) pair. In another embodiment, the range may be a static convention; devices and an MNO assume the same range. The range might also be dynamically adapted by the MNO in response to conditions such as collision rates, rollover for security reasons, etc. The current range might be communicated in an error/retry message or in an unused or overloaded field of a message structured to conform to a standard cellular protocol (although a functioning IMSI must be available to the cellular device to receive such a communication over the air). There may also be an assumption that the relevant HLR and cards initially securely store a master secret key, possibly in the same way standard secret keys are stored. As described next, the master secret key can help securely map unique IMSIs to respective unique dynamic secret keys.

Returning to FIG. 7, at step 180, an IMSI is selected from the predetermined range, perhaps randomly or per methods discussed above for selecting a profile. For example, if the predefined range spans 1,000 consecutive IMSIs, a random number from 1 to 1,000 is generated and added to a base IMSI value. At step 182, a dynamic security key is computed as a function of the IMSI and the master secret key. For example, the dynamic secret key is computed by symmetrically encrypting the IMSI with the secret master key. At step 184 the dynamically generated secret key and the selected IMSI are used to authenticate with the MNO. The encrypted handshakes described above with reference to FIG. 1 may be used, for example following the GSM standard, with the dynamic secret key serving as the secret shared by the card and the MNO. The MNO, knowing which IMSI is being used and knowing the secret master key, also computes the same dynamic secret key.

Other methods may be used to dynamically generate a key. For example, any mathematical function (a 1-to-1 mapping) may map a combination of the IMSI and the master secret key (e.g., a product, sum, concatenation, etc.) to the dynamic secret key. In one embodiment, before the provisioning IMSIs are used, the MNO may generate and store all of the dynamic secret keys for the respective IMSIs in the range. When authenticating, the pre-computed keys are looked up rather than computed.

At step 186, if there is a collision due to the selected IMSI being in use, then another IMSI is selected and steps 182 to 186 are repeated. At step 188, the channel on the MNO's network is used to provision the cellular device with a subscriber profile, which may be done in known ways. The subscriber profile is also activated by the MNO in the MNO's HLR. A reset of the device or card may be necessary to activate the subscriber profile on the card.

To provide provisional profiles with only limited privileges, the MNO may provide a separate SIM provisioning network and corresponding APN. During authentication the MNO recognizes that the IMSI corresponds to a provisioning profile and after authentication grants connectivity to only the SIM provisioning network. A server on the SIM provisioning network may assist in activation by providing the regular unique subscriber profile to the cellular device and to the HLR, and by instructing the HLR to create a new identity for the device/user and associate the subscriber profile with the device/user, and otherwise assist in moving the device from a provisioning state to an operational state. As noted above, the MNO performing the over-the-air provisioning need not be the same MNO as the MNO that issues the subscriber profile.

Because multiple cellular devices might be using a same IMSI in a same time period, the MNO's sequence numbers associated with respective provisional IMSIs could increase at a higher rate than normal. This could cause some of the cellular devices to receive sequence numbers that are larger than typically occur when cards have unique IMSIs. The authentication algorithm on the cards can be programmed to accept very large sequence numbers or even any sequence numbers that are not repeated, i.e., any sequence number that increases by any amount is accepted. In another embodiment, all sequence numbers are accepted, although the risk of a replay attack may increase.

Note that IMSIs are used herein only as an example of the type of information that can be used to uniquely identify a cellular device. Any other suitable subscriber identifier may be used with the techniques described above; in the discussion above, use of the term "IMSI" can be considered to also refer to a "subscriber identifier" which is any identifier with comparable function.

Embodiments and features discussed above can be realized in the form of information stored in volatile or non-volatile computer or device readable media. This is deemed to include at least media such as optical storage (e.g., compact-disk read-only memory (CD-ROM)), magnetic media, flash read-only memory (ROM), or any means of storing digital information. The stored information can be in the form of machine executable instructions (e.g., compiled executable binary code), source code, bytecode, or any other information that can be used to enable or configure computing devices to perform the various embodiments discussed above. This is also deemed to include at least volatile memory such as random-access memory (RAM) and/or virtual memory storing information such as central processing unit (CPU) instructions during execution of a program carrying out an embodiment, as well as non-volatile media storing information that allows a program or executable to be loaded and executed. The embodiments and features can be performed on any type of computing device, including portable devices, workstations, servers, mobile wireless devices, and so on. Given the description above, it will be routine to write source code that logically maps to the processes describe herein. Known programming tools (e.g., compilers) can be used in ordinary fashion to translate the source code into CPU instructions that can be executed by card processors, or by main processors of cellular devices, or by processors of backend MNO servers, as the case may be.

The invention claimed is:
1. A cellular device comprising:
 a card comprising storage that stores a provisioning profile comprising a shared International Mobile Sub- scriber Identity (IMSI) and a shared secure key, wherein the shared IMSI and the shared secure key are also stored by an MNO apparatus operated by a Mobile Network Operator (MNO) to service a cellular network provided by the MNO, the card further comprising instructions that, when executed by a processor of the cellular device or the card, dynamically generate, and store to the storage, the shared IMSI and the shared secure key;

the provisioning profile in the card, including the shared IMSI and the shared secure key, having been assigned to a plurality of other cards to enable other cellular devices comprising the respective cards to complete an authentication procedure via the cellular network with the MNO apparatus using the same shared IMSI and the same shared secure key, wherein the authentication procedure is compliant with a standard cellular communication protocol;

a radio configured to connect to cellular networks; and the storage storing additional instructions that, when the cellular device is operating, are executed by the processor to cause the processor to use the shared IMSI and the shared secure key to perform the authentication procedure with the MNO apparatus to establish a channel, via the radio, with the cellular network.

2. A cellular device according to claim 1, wherein the standard cellular communication protocol comprises one of: Global System for Mobile (GSM), 3GPP (3rd Generation Partnership Project), 3GPP2, Universal Mobile Telecommunications System (UMTS), Long-Term Evolution (LTE), Time Division Synchronous Code Division Multiple Access (TD-SCDMA), single-carrier Radio Transmission Technology (1×RTT), Enhanced Voice-Data Optimized (or "Only") (EV-DO), EVolution Data and Voice (EV-DV), mobile WiMax, WiBro (Wireless Broadband), and Ultra Mobile Broadband (UMB).

3. A cellular device according to claim 1, wherein the processor receives a subscriber profile via the channel, the subscriber profile comprising a unique IMSI and a unique key, activates the subscriber profile, and deactivates the provisioning profile.

4. A cellular device according to claim 1, wherein the processor generates the shared IMSI to be within a range of shared IMSIs.

5. A cellular device according to claim 4, wherein the card stores a master key that is also stored by the other cards and by the MNO apparatus, and wherein the generating further comprises computing the shared secured key based on the master key and based on the shared IMSI.

6. A cellular device according to claim 1, wherein when the authentication procedure has completed and resulted in an authentication, the cellular device is granted privileges to a limited set of one or more services at the MNO.

7. A cellular device according to claim 6, wherein the limited set of one or more services consists of only services provided by the MNO that are necessary to provision and activate a subscriber profile.

8. A cellular device comprising:
storage that stores a provisioning profile comprising a shared International Mobile Subscriber Identity (IMSI) and a shared secure key, wherein the shared IMSI and the shared secure key are also stored by a Mobile Network Operator (MNO) apparatus operated by an MNO to service a cellular network provided by the MNO;

the provisioning profile, in the storage, including the shared IMSI and the shared secure key, having been assigned to a plurality of other cards to enable other cellular devices comprising the respective cards to complete an authentication procedure via the cellular network with the MNO apparatus using the same shared IMSI and the same shared secure key, wherein the authentication procedure is compliant with a standard cellular communication protocol;

a radio configured to connect to cellular networks;

the storage storing instructions that, when the cellular device is operating, are executed by a processor of the cellular device to cause the processor to use the shared IMSI and the shared secure key to perform the authentication procedure with the MNO apparatus to establish a channel, via the radio, with the cellular network; and the storage storing additional instructions that, when executed by the processor, cause the processor to perform the authentication process with the MNO apparatus, wherein as part of the authentication process a sequence number associated with the provisioning profile is received by the cellular device via the channel, and the sequence number is either not used for authentication or is determined to be sufficient for authentication if the sequence number is greater, by any amount, than a previously received sequence number.

9. A cellular device comprising:
a card comprising storage that stores a first provisioning profile comprising a first shared International Mobile Subscriber Identity (IMSI) and a first shared secure key, the storage further storing a second provisioning profile comprising a second shared IMSI and a second shared secure key, the first and second shared IMSIs and the first and second shared secure keys having been assigned to a plurality of other cards to enable other cellular devices comprising the respective cards to complete an authentication procedure via the cellular network with the MNO apparatus, wherein the authentication procedure is compliant with a standard cellular communication protocol;

a radio configured to connect to cellular networks; and the storage storing instructions that, when the cellular device is operating, are executed by a processor to (i) cause the processor to use the first shared IMSI and the first shared secure key to perform the authentication procedure with the MNO apparatus, and (ii) determine that the performance of the authentication procedure using the first shared IMSI and the first shared secure key did not result in authentication with the cellular network and in response use the second shared IMSI and the second shared secure key to perform the authentication procedure.

10. A cellular device according to claim 9, wherein the first provisioning profile and the second provisioning profile are stored concurrently by the storage.

11. A cellular device according to claim 9, wherein, for at least some amount of time greater than zero, the first provisioning profile and the second provisioning profile are not stored concurrently by the storage.

12. A method comprising:
enabling a same provisioning IMSI and associated provisioning secret key, and a same second provisioning IMSI and associated second provisioning secret key to all be concurrently available for use by a plurality of cards to authenticate with a cellular network, wherein each of the cards in the plurality of cards is provisioned with the IMSI, the secret key, the second IMSI, and the second secret key, wherein each of the cards in the plurality of cards is configured with instructions that, when the cards are operating, facilitate communication with cellular networks, wherein cellular devices are respectively comprised of the cards;

authenticating some of the cellular devices on the cellular networks using the provisioning secret key and the provisioning IMSI, and authenticating other of the cellular devices on the cellular networks using the second provisioning secret key and the second provisioning IMSI; and each time one of the cellular devices is authenticated with the provisioning secret key and the provisioning IMSI or with the second provisioning secret key and the second provisioning IMSI, provisioning the corresponding authenticated one of the cellular devices with a corresponding unique subscriber profile comprised of a unique IMSI and a unique secret key.

13. A method according to claim 12, wherein the cellular network comprises a Authentication Center (AuC), a Home Location Register (HLR), and an Access Point Name (APN) for a provisioning data network, the method further comprising authenticating a cellular device with the AuC, and in response activating a corresponding subscriber profile in the HLR, the authenticating by the AuC providing access rights to the cellular device that are substantially limited to accessing the APN to initiate provisioning of the subscriber profile to the cellular device and to the HLR.

14. A method according to claim 12, wherein the cellular devices are authenticated for the cellular network by exchanging messages with the cellular network, the messages exchanged according to a standard cellular communication protocol implemented by the cellular network and the cellular devices.

15. A method according to claim 12, wherein at least one of the cellular devices uses both the provisioning IMSI and the second provisioning IMSI.

16. A method of enabling over-the-air provisioning of cellular devices, the method performed by one or more server devices of a cellular network, the method comprising:

storing a master key, wherein the master key is also stored on each of the cellular devices;

receiving, through the cellular network, secret keys and respective IMSIs transmitted by the cellular devices, the received secret keys and respective IMSIs having been generated by the cellular devices using the master key;
  based on the received secret keys and respective IMSIs, authenticating the cellular devices for gaining provisioning access to the cellular network; and provisioning, via the cellular network, the cellular devices with subscriber profiles when they are authenticated for provisioning access to the cellular network, the subscriber profiles comprised of respective different IMSIs.

17. A method according to claim 16, wherein the IMSIs are generated to be within a range of provisioning IMSIs.

18. A method according to claim 16, wherein when a subscriber profile is provisioned for a corresponding cellular device to use the subscriber profile, the subscriber profile is also activated in an HLR of an MNO that operates the cellular network.

19. A method according to claim 16, wherein each cellular device is configured to be able to generate each secret IMSI and each secret key.

20. A method for cellular devices to perform over-the-air provisioning, the method performed by one of the cellular devices, the method comprising:

attempting a first authentication to gain provisioning access to a cellular network with a first shared IMSI, the first shared IMSI available for authentication by other of the cellular devices;

receiving an indication that the first authentication attempt did not result in an authentication; and in response to receiving the indication, performing a second authentication with a second shared IMSI, the second shared IMSI available for authentication by the other of the cellular devices.

* * * * *